No. 611,622. Patented Oct. 4, 1898.
E. D. FULFORD.
PIGEON TRAP.
(Application filed Apr. 6, 1898.)
(No Model.) 2 Sheets—Sheet 2.

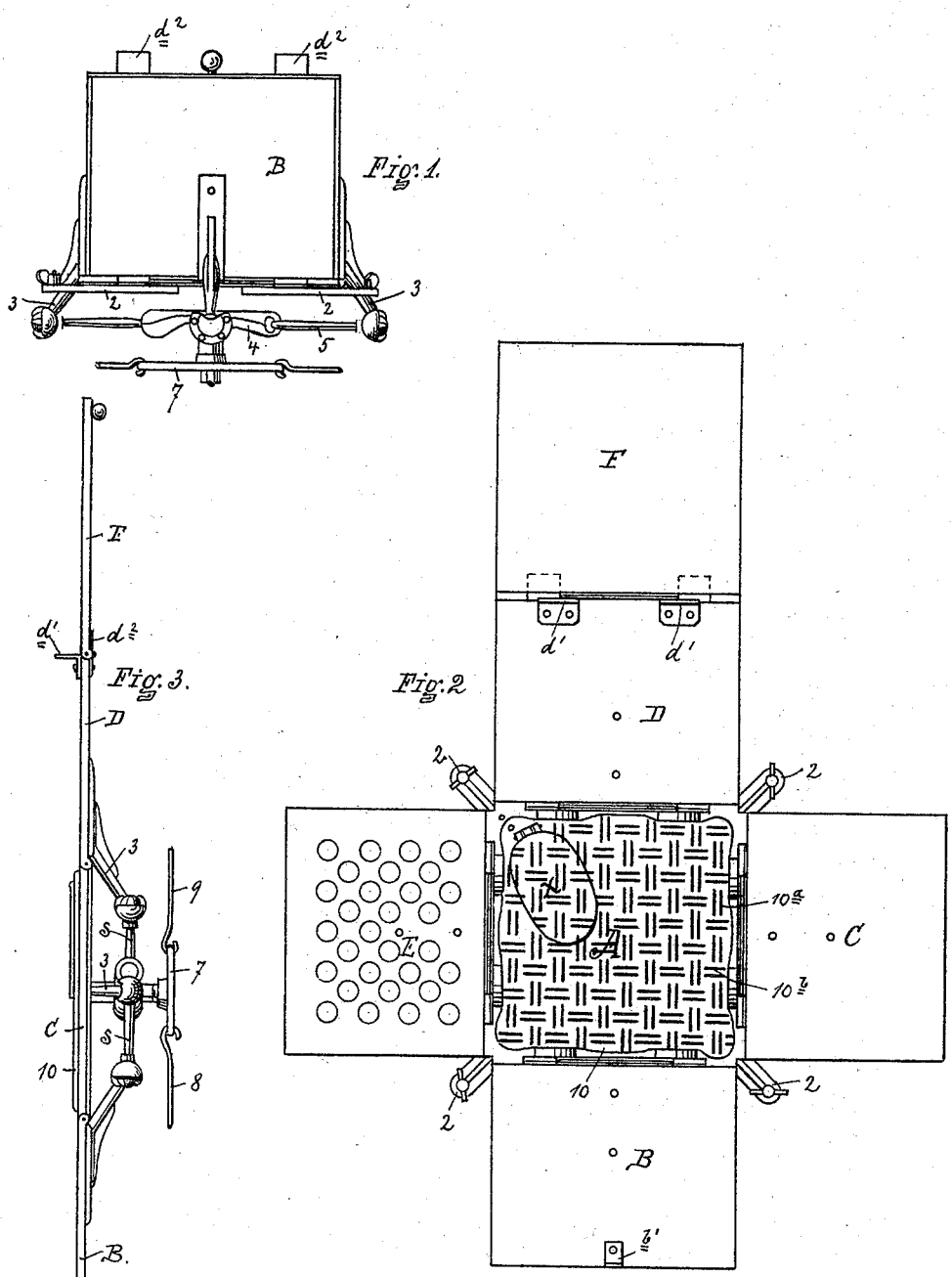

WITNESSES.
Rich. A. George
Phebe A. Farmer

INVENTOR
ELIJAH D. FULFORD
By Milton E. Robinson
ATTORNEY.

THE NORRIS PETERS CO., PHOTO-LITHO., WASHINGTON, D. C.

UNITED STATES PATENT OFFICE.

ELIJAH D. FULFORD, OF UTICA, NEW YORK.

PIGEON-TRAP.

SPECIFICATION forming part of Letters Patent No. 611,622, dated October 4, 1898.

Application filed April 6, 1898. Serial No. 676,609. (No model.)

*To all whom it may concern:*

Be it known that I, ELIJAH D. FULFORD, of Utica, in the county of Oneida and State of New York, have invented certain new and useful Improvements in Pigeon-Traps; and I do hereby declare that the following is a full, clear, and exact description of the invention, which will enable others skilled in the art to which it appertains to make and use the same, reference being had to the accompanying drawings, and to the letters and numerals of reference marked thereon, which form part of this specification.

The object of my invention is to provide a quick-action trap having a simple construction and which can be easily operated by reason of its simple construction and with a minimum amount of friction; also, to provide in connection with the trap an electric exciting device.

The nature of the invention appears by the following more particular description.

Figure 4:
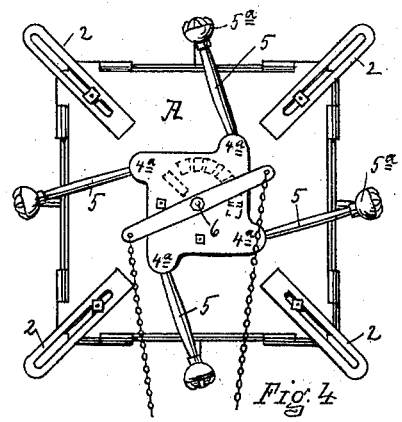
Figure 5:
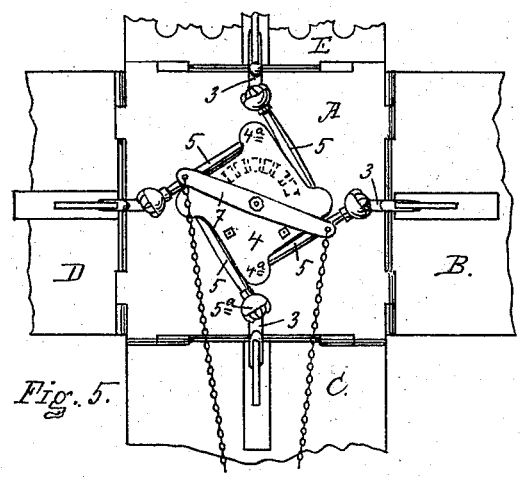
Figure 6:
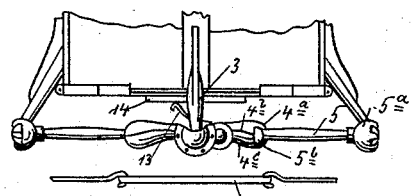
Figure 7:
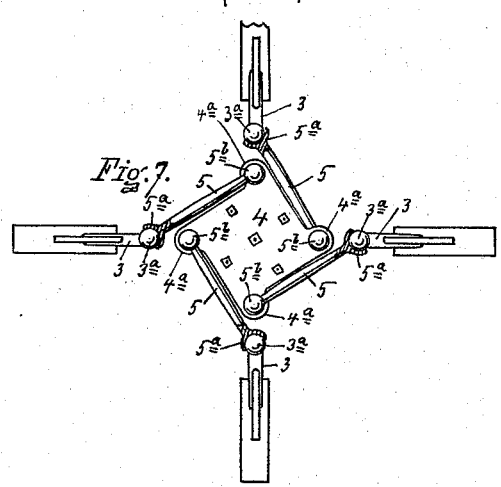
Figure 8:
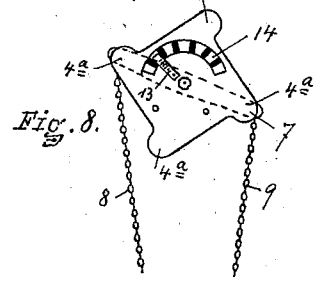
Figure 9:
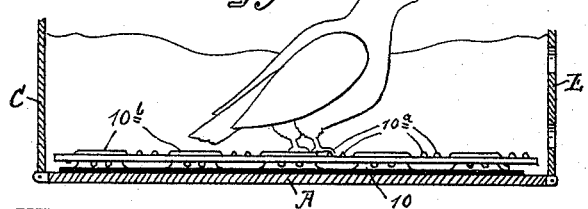
Figure 10:
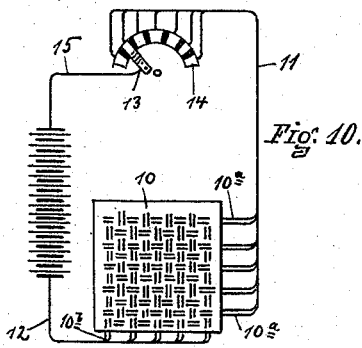

In the drawings, Figure 1 shows a front elevation of the pigeon-trap closed. Fig. 2 shows a plan open. Fig. 3 shows a side or edge in open position. Fig. 4 shows the under side of the trap in closed position. Fig. 5 shows the same in open position, the outlying parts being removed. Fig. 6 shows details on side elevation. Fig. 7 shows details of the operating parts in plan. Fig. 8 shows a plan of parts of the operating mechanism, showing details particularly relating to the electrical features. Fig. 9 shows a partial section also relating more particularly to the electrical features. Fig. 10 shows a diagram of the electrical parts or appliances of the trap.

Referring to the reference characters in a more particular description, A indicates the bottom or base of the device, B, C, D, and E the sides, and F the cover. The sides are hinged to the edges of the bottom and the cover to the edge of the side D. The base is intended to be mounted over a pit, and for supporting and securing the device there are provided on the base slotted arms 2 2, &c. Each of the sides is provided with an arm 3, projecting therefrom by the hinge at an angle of about forty-five degrees and provided with a ball $3^a$ of a ball-and-socket joint at its end. Each of the arms 3 is connected to the toggle-plate 4 by a connecting-rod 5, having a socket portion $5^a$ of the joint adapted to receive the ball $3^a$ at one end and having a ball portion $5^b$, received by the ball-sockets $4^a$ in the edge of the toggle-plate 4. The toggle-plate 4 consists of two parts $4^b$ and $4^c$, secured together and separating on a horizontal line, whereby the balls $5^b$ are capable of being placed or removed. The toggle-plate 4 is mounted on a vertical shaft or pivot 6 beneath the base and is capable of rocking from the position shown in Fig. 4, or substantially this position, to the position shown in Fig. 5. Connected to the toggle-plate 4 and operating with the same is a cross-bar or lever 7, by means of which the trap may be operated from a distance by the two connections 8 and 9, attached on opposite sides of the pivotal point of the lever at a distant point or in any other suitable manner. One of the connections 8 or 9 may be dispensed with by substituting in its place a spring secured at one end to a fixed point and at the other to the end of the cross-bar or lever 7. The spring would preferably be arranged to open the trap when the cable was slackened.

For supporting the cover F in its closed position there is provided on the edge of the side D angular projections $d'$ $d'$ and on the edge of the side B a similar projection $b'$. For causing the cover F to close when the trap is closed there is also provided on the edge of the side D outside projecting pieces $d^2$ $d^2$.

In the bottom or base of the trap there is provided an opening, through which the pigeon may be placed in the trap when closed, said opening being closed by a hinged cover X.

In the base of the trap I provide a mat 10 of insulating material and containing sets of electric wires $10^a$ and $10^b$, introduced in the mat so as not to be in electrical connection, but presenting above the mat short sections of wires insulated from each other, as shown, constituting poles or electrodes. The wires $10^a$ are connected with one branch of the circuit-wire at 11, while the other wires $10^b$ are connected with the other branch 12 of a circuit-wire.

8 indicates a battery, and 13 is a traveling contact-spring secured on the upper side of the toggle-plate 4 and having its free end adapted to pass over the successive contact-plates secured on under side of base A and arranged in a semicircular form, as indicated at 14. The spring 13 is electrically connected by a wire 15 with the battery-wire. The several sections of the semicircular contact 14 are connected with the wire 11. As the trap is sprung and the toggle-plate makes a partial swinging movement the spring 13 passes over the succession of contact-plates, making and breaking the circuit as between the wires $10^b$ and $10^a$ in the mat. The bird will receive a succession of electric shocks which will excite and cause it to leave the trap speedily when the same is open.

The mechanical features for opening and closing the trap are such that the trap is quick-acting. In opening the trap the toggle-plate and connections pass from the position shown in Fig. 4 to that shown in Fig. 5, and the sides and cover open into a horizontal plane, as shown in Figs. 2 and 3. In case the bird fails to leave the trap it may be excited by partially closing and opening the trap by means of the connections 8 and 9 from the score, the toggle-plate and connecting-rods allowing such freedom of action that the sides and top when in their horizontal position, or substantially so, can be easily flapped from the scorer's position.

By making the connecting-rods 5 a trifle shorter than is shown the toggle-plate 4 can be brought into a position so that the ball-joint between the plate and the connecting-rod 5 will take a position more directly between the pivotal point of the plate and the end of the side arms 3, and the sides will be more firmly locked in closed position. This has an objectionable feature, however, in that the trap is not as quick-acting when the toggle is brought more nearly to a straight position.

What I claim as new, and desire to secure by Letters Patent, is—

1. In a pigeon-trap a base, the opening sides hinged at their lower edge, each having an arm projecting at an angle from the lower edge, a rocking toggle-plate pivoted under the base and connecting-rods attached to the said arms and said plate, respectively between each of the said arms and toggle-plate, substantially as set forth.

2. In a pigeon-trap a base, the opening sides hinged at their lower edges to the base, an arm projecting at an angle from the lower edge of each side, a rocking toggle-plate located beneath the base and connecting-rods connecting said arms and toggle-plate and having ball-and-socket joints at each end, substantially as set forth.

3. In a pigeon-trap an electrical exciting appliance consisting of a series of circuit-poles arranged in the base of the trap, a circuit maker and breaker in connection therewith and means for supplying the electricity, substantially as set forth.

4. The combination in a pigeon-trap of the opening and closing sides, mechanism for operating the sides, an electric-circuit make-and-break mechanism connected with and operating with the trap mechanism, and a series of electric poles arranged in the bottom of the trap, substantially as set forth.

In witness whereof I have affixed my signature, in presence of two witnesses, this 31st day of March, 1898.

ELIJAH D. FULFORD.

Witnesses:
J. L. BREWER,
HEBER Y. YOST.